No. 703,633. Patented July 1, 1902.
F. D. ALLISON.
COMBINED LADDER AND SETTEE.
(Application filed Sept. 26, 1901.)
(No Model.)
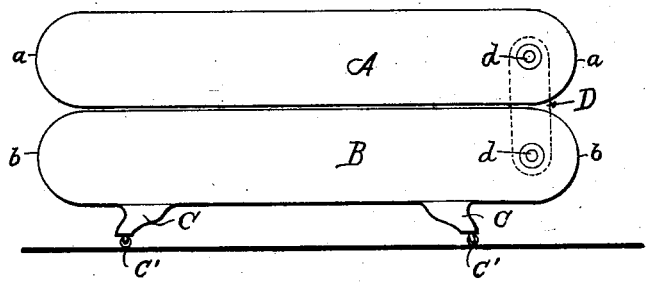
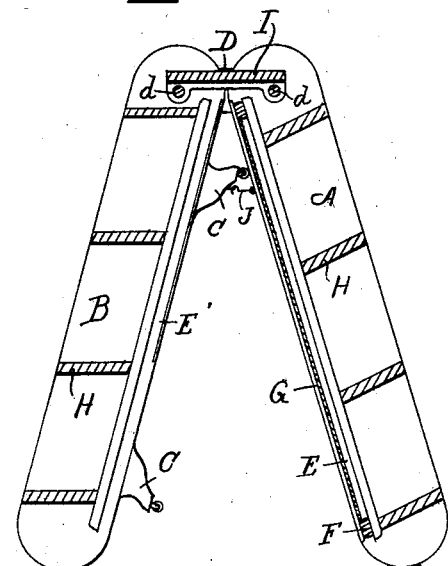
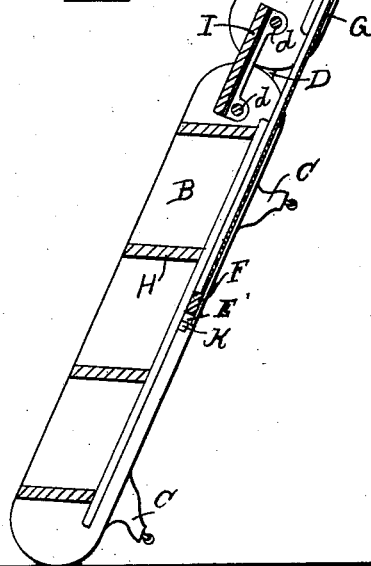
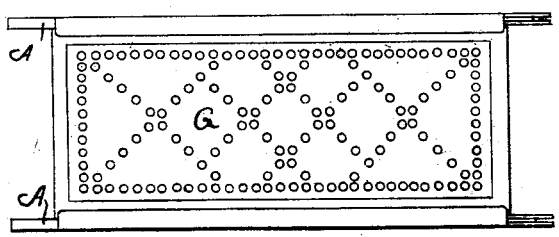
Witnesses:
F. A. Otto
C. L. Rouch
Inventor
Fletcher D. Allison
By Erwin & Wheeler
Attorneys.
THE NORRIS PETERS CO., PHOTO-LITHO., WASHINGTON, D. C.

UNITED STATES PATENT OFFICE.

FLETCHER D. ALLISON, OF CHICAGO, ILLINOIS.

COMBINED LADDER AND SETTEE.

SPECIFICATION forming part of Letters Patent No. 703,633, dated July 1, 1902.

Application filed September 26, 1901. Serial No. 76,594. (No model.)

*To all whom it may concern:*

Be it known that I, FLETCHER D. ALLISON, a citizen of the United States, residing at Chicago, county of Cook, and State of Illinois, have invented new and useful Improvements in a Combined Ladder and Settee, of which the following is a specification.

My invention relates to improvements in combined ladders and settees.

The object of my invention is to provide a form of device which may be used as an ordinary step-ladder or as an extension-ladder and which when not in use as a ladder may be folded and used as a bench or settee.

In the following description reference is had to the accompanying drawings, in which—

Figure 1 is a side view of my invention as it is when used as a settee. Fig. 2 is a longitudinal sectional view of the same when used as an ordinary step-ladder. Fig. 3 is also a longitudinal sectional view showing the ladder as it is when extended. Fig. 4 is a top view of the device when folded, as shown in Fig. 1.

Like parts are identified by the same reference-letters throughout the several views.

The side bars of my ladders are formed in sections A and B, the ends of which are preferably rounded, as shown at $a$ and $b$. The section B is provided with legs C on its under surface or in the rear of the steps H, preferably having casters C', upon which the entire device is supported when used as a settee. The section A is connected at one end with the adjacent end of the section B by the link D, the link being connected with the respective sections by pivotal rods $d$, located at the respective centers of the arcs of curvature $a$ and $b$, in which the ends of the sections are formed. The side bars of the respective sections are preferably slotted, as shown at the right hand in Fig. 4, and the links D inserted in the slots, so that they are practically concealed by the material composing the side bars, while such material reinforces the links and prevents them from wabbling on their pivot-rods $d$.

Each side-bar section A is provided with a channel E in the rear of the steps or near the edge which is uppermost when the device is folded, as shown in Fig. 1. The side-bar sections B are formed with a similar channel E' in the rear of the steps or near their lower edge. A seat-frame F is formed to fit between the side bars and slidably engaged in said channels, the frame being normally adjusted in the channels E of the sections A. In the drawings I have shown the frame as covered with perforated board G; but any other form of seat, upholstered or otherwise, may obviously be substituted for the board G. The side sections A A, as well as those B B, are connected with each other by suitable steps H, as in an ordinary step-ladder. A step or platform I constitutes the upper step when the device is in the position in which it is shown in Fig. 2 and is pivotally secured at each end to the rods $d$. When the device is folded, as shown in Fig. 1, the link D occupies a substantially vertical position, connecting the sections A and B near one end; but when it is desired to use the device as a step-ladder the sections are raised to a substantially vertical position and the section A is revolved around the end of the section B to the position in which it is shown in Fig. 2, when the two sections are secured together by a catch J, so as to prevent them from spreading. The steps H of the section B are then in a horizontal position, so that the ladder is ready for use.

When it is desired to use the device as an extension-ladder, the sections A and B are alined, as shown in Fig. 3, and the frame F is adjusted so as to engage in both the channels E of the sections A and the channels E' of the sections B, crossing the joints formed by the link D, and thus serving to hold the two sections rigidly in alinement with each other. One or both the channels E' of the section B are provided with a stop K to prevent the frame F from sliding downwardly beyond the joint when the ladder is raised, as shown in Fig. 3. These steps K, as shown in the drawings, consist merely in blocks located in the channels E' of the section B. (See Fig. 3.)

Having thus described my invention, what I claim as new, and desire to secure by Letters Patent, is—

1. In a device of the described class, the combination of a ladder formed in sections; a link connecting the meeting ends of said sections, and a seat secured to one of the sections in the rear of the steps or rungs of the ladder, said connecting-link being adapted to permit the sections to be folded in a position with the seat uppermost.

2. In a device of the described class, the combination of a ladder formed in sections; legs secured to one of said sections in the rear of the steps or rungs; a seat secured to the other of said sections in the rear of the steps or rungs, and a link connection between adjacent ends of said sections adapted to permit one of said sections to swing freely around the end of the other section.

3. In a device of the described class, the combination of a ladder formed in sections, and having channels in the side bars of said sections; a seat-frame slidably mounted in said channels and adapted to be adjusted to cross the meeting ends of said sections and engage in the channels of both sections; a link connecting the meeting ends of said sections and adapted to permit one of said sections to be swung around the end of the other section.

4. In a device of the described class, the combination of a ladder formed in sections; a link connecting the meeting ends of said sections, and a seat secured to one of the sections in the rear of the steps or rungs of the ladder, said connecting-link being adapted to permit the sections to be folded in a position with the seats uppermost, and a step or platform pivotally connected with both sections by pivots common to said platform and link.

5. In a device of the described class, the combination of a ladder formed in sections; a link connecting the sections and adapted to permit one section to be rotated, end to end, around the other section; legs formed on the rear side of one of said sections and a seat formed on the rear side of the other of said sections, together with a catch adapted to hold said sections in a divergent position of adjustment with the rear surfaces of the two sections opposed to each other.

In testimony whereof I affix my signature in the presence of two witnesses.

FLETCHER D. ALLISON.

Witnesses:
JAS. B. ERWIN,
LEVERETT C. WHEELER.